United States Patent [19]

Narahara

[11] 3,830,961

[45] Aug. 20, 1974

[54] MAGNETIC RECORDING AND REPRODUCING SYSTEM

[75] Inventor: Hisaaki Narahara, Tokyo, Japan

[73] Assignee: Sony Corporation, Tokyo, Japan

[22] Filed: May 21, 1973

[21] Appl. No.: 362,053

[30] Foreign Application Priority Data

May 22, 1972 Japan .............................. 47-50461

[52] U.S. Cl. .......................................... 178/5.4 CD

[51] Int. Cl. ............................................ H04n 5/78

[58] Field of Search .................... 178/5.4 R, 5.4 CD

[56] References Cited

UNITED STATES PATENTS

| | | | |
|---|---|---|---|
| 3,660,596 | 5/1972 | Numakura | 178/5.4 CD |
| 3,715,468 | 2/1973 | Fujita | 178/5.4 CD |
| 3,730,983 | 5/1973 | Numakura et al. | 178/5.4 CD |

*Primary Examiner*—Robert L. Richardson
*Attorney, Agent, or Firm*—Lewis H. Eslinger, Esq.; Alvin Sinderbrand, Esq.

[57] ABSTRACT

In a system in which chrominance signals are recorded only during alternate line intervals and in which the reproducing apparatus forms a replica of each line interval of recorded chrominance signals and uses that replica during a line interval when no chrominance signal is recorded, a pattern of bright areas in the reproduced picture is made less objectionable by redistribution. The signals are prepared for recording by converting the chrominance signals to a specific, relatively low frequency band and by frequency modulating a somewhat higher frequency carrier by means of the luminance signal. The objectionable pattern of bright areas is caused by the second harmonic of the frequency-converted chrominance carrier. These areas are shifted into less noticeable positions by generating the converted carrier to have a frequency that is approximately ⅛ of an odd number times the line scanning frequency. The spots may be made even more unnoticeable by a further slight shift in position from one field to the next in each group of four successive fields.

5 Claims, 30 Drawing Figures

MAGNETIC RECORDING AND REPRODUCING SYSTEM

BACKGROUND OF THE INVENTION

1. Field of the Invention

This invention relates to a system for eliminating certain types of interfering signals in the magnetic recording and playback of television signals. In particular, it relates to the minimization of visible interference from the second harmonic of the frequency-converted chrominance carrier, particularly in the type of recording in which chrominance signals of only alternate line intervals are recorded and successive fields are recorded on closely adjacent, or even overlapping, slant tracks on magnetic tape.

2. Prior Art

U.S. Pat. No. 3,730,983 describes a system for recording and reproducing radio signals by first separating the composite color video signal into chrominance and luminance components, frequency modulating a carrier with the luminance components, frequency converting the chrominance components to a band below the band of the frequency-modulated carrier and then combining the frequency-converted chrominance components and the frequency-modulated carrier and recording the combined signal on a magnetic medium. In reproducing a television image from the recorded signal the reverse operation is carried out.

U.S. Pat. No. 3,730,983 includes means to set the carrier of the frequency-converted chrominance signal so that the second harmonic of that carrier would be interleaved with the luminance signal to eliminate interference from the second harmonic signal. The frequency of the frequency-converted carrier is therefore given by the equation $f_c = \frac{1}{4} f_H (2m-1)$, in which $f_H$ is the fundamental of the horizontal scanning frequency, and $m$ is a selected integer.

In U.S. Application Ser. No. 277,815, filed Aug. 3, 1972, and assigned to the assignee of the present application, an improved magnetic recording and reproducing system is described in which slant tracks on which successive television fields are recorded are arranged very close together or may even be overlapping, contrary to prior recording techniques in which the adjacent slant tracks had to be spaced some distance apart to avoid undesired pick up of signals from one track when an adjacent track was being played back. The pick up of such undesired signals was minimized by recording at least the frequency-converted chrominance signal components only during alternate line intervals, the recorded line intervals in adjacent tracks being non-adjacent intervals so that the chrominance recording, if visible, would present a checkerboard appearance.

In reproducing a color television image from a signal in which the chrominance components are recorded only during alternate line intervals, the system in application Ser. No. 277,815, proposed that each line interval of chrominance signal be utilized at the time it was reproduced and that it be simultaneously delayed to produce a replica which would then be used in place of the non-existant chrominance signal of the next succeeding line interval or perhaps the third or fifth succeeding line intervals. Unfortunately, some of the effect of interleaving the frequency-converted chrominance carrier with the luminance signals is lost when only alternate line intervals of the luminance signals are recorded. As a result, the undesired second harmonic is passed through such a system in a way that results in a formation of relatively noticeable, bright vertical stripes in the reproduced color image.

Accordingly, it is one object of the present invention to minimize the visibility of spots of light caused by the second harmonic of the frequency-converted area.

Another object is to provide means to generate the carrier of the frequency-converted chrominance signal at a frequency such that its second harmonic produces spots of light that are evenly distributed and in a relatively unnoticeable pattern in the reproduced color television image.

Further objects will come apparent from the following specification and the drawings.

BRIEF DESCRIPTION OF THE INVENTION

In accordance with the present invention, the frequency-converted carrier in a recording system arranged to record the chrominance signals only during alternate line intervals is generated by beating the original chrominance signal with a local signal that has a frequency equal to the sum of the original chrominance carrier frequency plus a specific non-integral submultiple of the original chrominance carrier frequency. The locally generated signal must be such that, when it is combined with the original chrominance signal, it converts the frequency of the chrominance carrier to a frequency which is approximately given by the equation $f_c = \frac{1}{8}(2m-1) f_H$, where $m$ is any integer, and $f_H$ is the frequency of the horizontal scanning signal of the television system. The pattern of dots may be made even less noticeable by setting the frequency-converted chrominance carrier frequency $f_c$ in accordance with the following equation.

$f_c = \frac{1}{8}(2m-1) f_H \pm f_V/4$, where $f_V$ is the vertical scanning frequency of the television system.

DETAILED DESCRIPTION OF THE INVENTION

Figure 1:
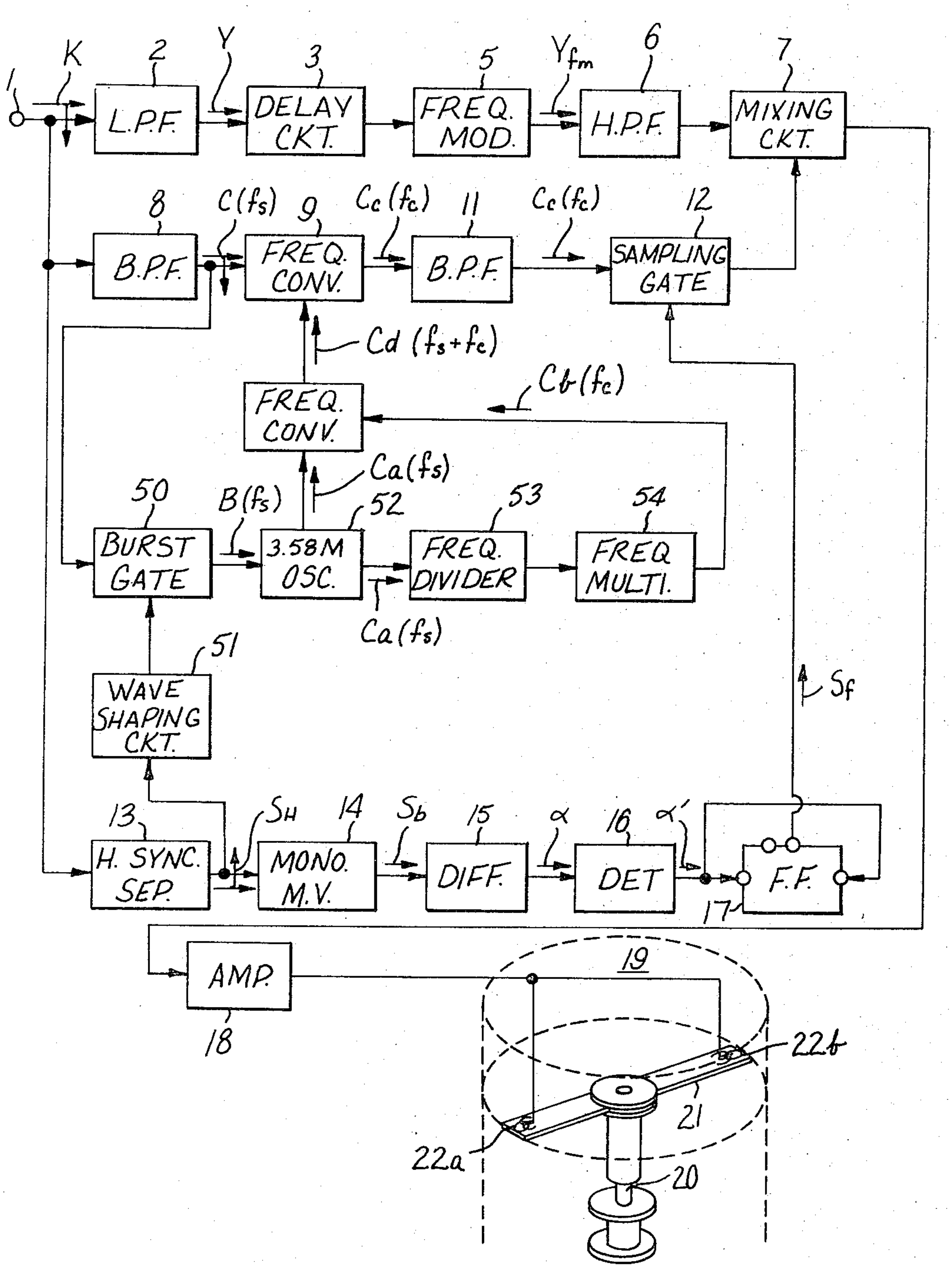
FIG. 1 is a block diagram of a recording system, including means for generating a frequency-converted chrominance carrier according to the present invention.
Figure 2A:
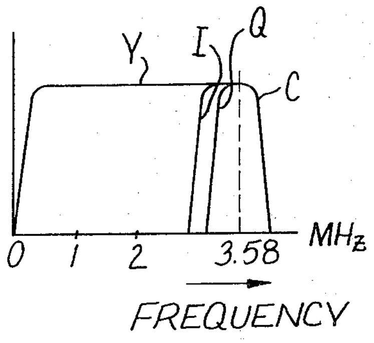
FIG. 2A shows the band of frequencies occupied by a composite television signal.

Referring to FIG. 1 of the drawings, it will be seen that an input terminal 1 is provided to receive an input signal K which is to be magnetically recorded and reproduced. Although the system of the present invention is applicable to various input signals, the preferred embodiment as hereinafter described is presented as utilizing an NTSC system composite color television signal. Such composite signal consists of a luminance signal Y and a modulated chrominance signal $C(f_s)$. The latter includes a color subcarrier of approximately 3.58 MHz with I and Q chrominance signals amplitude-modulated on the subcarrier 90° out of phase with each other. The frequency bands occupied by these signals are shown in FIG. 2A.

Figure 2B:
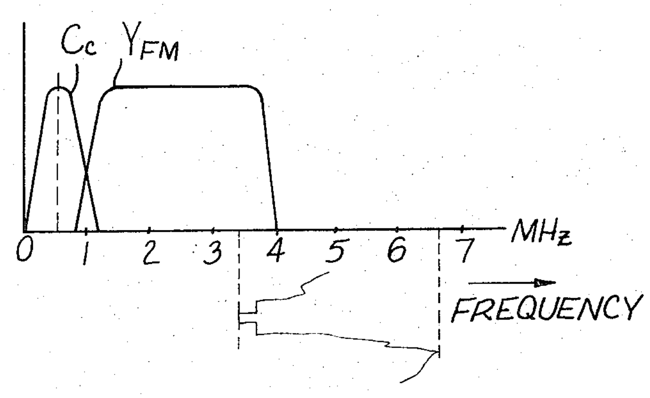
FIG. 2B shows the frequency bands occupied by the frequency-converted chrominance signal and the frequency-modulated signal that includes luminance information.

An input terminal 1 is connected to several different circuits, one of which is a low pass filter 2 having a cut-off frequency of about 3MHz. The purpose of this filter is to extract only the luminance signals from the composite color video signal applied to the terminal 1. The output of the low pass filter 2 is connected to a delay circuit 3. The output of the delay circuit 3 is applied to a frequency modulator 5 and is used to modulate a carrier wave by means of the luminance signal, so that, for example, the tip level of the synchronizing signal may correspond to about 1MHz and the peak level to about 4MHz as shown in FIG. 2B. The resulting frequency-modulated signal $Y_{FM}$ is then supplied to a high-pass filter 6 to remove low frequency components, and the output of this filter is then applied to a mixing circuit 7.

The modulated chrominance signal $C(f_s)$ is extracted from the composite signal K by a band pass filter 8 which has, for example, a band width of ±0.6 MHz with the center frequency $f_s$ of the band being at 3.58 MHz. The signal $C(f_s)$ is supplied to a frequency converter 9 which may be constructed in the form of a balanced modulator. Further, a part of the extracted modulated chrominance signal $C(f_s)$ is supplied to a burst gate or burst signal extracting circuit 50 so that a burst signal $B(f_s)$ of 3.58 MHz is obtained.

The burst gate is also synchronized with the horizontal synchronizing signal included in the frequency band of the luminance signal. A horizontal synchronizing signal separator 13 and a wave shaping circuit 51 are connected between the input terminal 1 and the burst gate 50 to sense the horizontal synchronizing signal coming from the input terminal 1 and provide a gate signal to the burst gate 50. The gated burst signal $B(f_s)$ is supplied to a 3.58 MHz oscillator 52 which provides a signal $Ca(f_s)$, which is locked to the burst signal frequency.

The signal $Ca(f_s)$ from the oscillator 52 is supplied to a frequency converter 10 to which is also supplied a second signal $Cb(f_c)$. This second signal has a fixed lower frequency, which is the same as the carrier frequency of the frequency-converted chrominance signal and is chosen to place the band of the frequency-converted chrominance signal below the band of the frequency-modulated luminance signal.

The second signal $Cb(f_c)$ is provided by a frequency divider 53 which receives the signal $Ca(f_s)$ from the oscillator 52. This divided signal is applied to a frequency multiplier 54. The frequency converter 10 receives the first signal $Ca(f_s)$ and the second signal $Cb(f_c)$ and a third signal $Cd(f_s+f_c)$ having a frequency which is their sum and, in the example being described, the sum of the frequencies $f_s$ and $f_c$ of the signals $Ca$ and $Cb$.

The third frequency signal $Cd(f_s+f_c)$ is applied to the frequency converter 9 to beat with the frequency of the modulated chrominance signal $C(f_s)$ so that the frequency-converted chrominance signal $Cc(f_c)$ that issues from the converter 9 will have a bandwidth of about ±0.6 MHz with a carrier shifted to the second frequency, that is, the difference between the subcarrier frequency (3.58 MHz) of the chrominance signal $C(f_s)$ and the frequency of $f_c+f_s$. The frequency-converted chrominance signal $Cc(f_c)$ is supplied through a band-pass filter 11 to remove high frequency components and from there to a sampling gate 12 that transmits alternate intervals of the chrominance signal in accordance with this invention.

The alternate intervals are selected to be the alternate horizontal line intervals of the television signal and in order to obtain the necessary switching control. the output of the synchronizing signal separator 13 is connected to a monostable multivibrator 14. This multivibrator, in turn, supplies a signal to a differentiating circuit 15, the output of which is passed through a rectifier, or detector, circuit 16 and applied to a flip-flop circuit 17. The flip-flop circuit controls the operation of the sampling gate 12. and the output of this gate is then connected to the mixing circuit 7.

The output of the mixing circuit may, if necessary, be amplified in an amplifier 18 and applied to a rotary magnetic head assembly 19 that comprises a support 21 mounted on a rotating shaft 20 to be driven at a predetermined speed by a motor (not shown). At opposite ends of the support 21 are magnetic transducers *22a* and *22b* connected in parallel to the output of the amplifier 18. The tape on which the signal is to be recorded is wound preferably slightly more than half-way around a cylindrical surface indicated in dotted lines. The tape path is a section of a helix and crosses the path of the transducers *22a* and *22b* as they are rotated by the shaft 20.

The operation of the apparatus in FIG. 1 will be described with reference to FIGS. 2A and 2B and FIGS. 3A and 3E. The total incoming signal applied to the terminal 1 is indicated in FIG. 2A as occupying the band between 0 and approximately 4 MHz. This signal includes the luminance components indicated by the designation Y and the chrominance components indicated by C which consists of I and Q components. After the chrominance components have been separated from the luminance components and converted to a lower frequency, they occupy the band indicated by $C_c$ in FIG. 2B. At the same time the luminance components, having been used to modulate the frequency of a carrier in the frequency modulator 5, are now designated $Y_{FM}$ in FIG. 2B and occupy a frequency band from approximately 1 MHz to approximately 4 MHz.

Figures 3A, 3B, 3C, 3D, 3E:
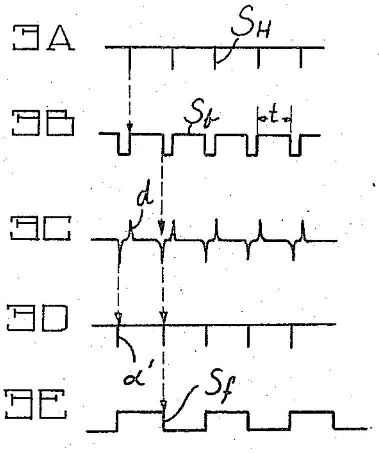
FIGS. 3A–3E are waveform diagrams generated by the recording system in FIG. 1.

In order to obtain the necessary switching information, the video signal applied to the sync separator 13 results in the production of sync signals indicated $S_b$ in FIG. 3A. These signals are then applied to the monostable multivibrator 14 to produce a pulse wave $S_b$ in FIG. 3B having a relatively high duty cycle as indicated by the fact that the duration *t* of the positive portion is much greater than the duration of the negative portion. In fact, the ratio of these two durations is so great that it is desirable to divide the monostable multivibrator 14 into two monostable multivibrators, one of which has time constants that cause it to produce an output signal similar to that in FIG. 3B but with a duty cycle such that the positive half is somewhat greater than 0.5H, for example, approximately 0.7H. This first multivibrator may then be used to trigger a second multivibrator which produces a signal having a positive portion such that the total of its positive portion with that of the first multivibrator results in the signal $S_b$ as shown in FIG. 3B.

The signal $S_b$ at the output of the monostable multivibrator, or multivibrators, 14 is differentiated in the circuit 15 to produce an output signal indicated by $\alpha$ in FIG. 3C. This signal is then passed through the detector 16 which selects the negative going part as indicated in FIG. 3D and designated $\alpha'$. The latter signal is then used to trigger the flip-flop circuit 17 to reverse its state of conductivity at the occurrence of each of the negative going pulses $\alpha'$ shown in FIG. 3D. Thus, the output of the flip-flop circuit 17 is indicated by the square wave $S_f$ in FIG. 3E and is applied to the sampling gate 12 to control its operation. The duty cycle of this wave is exactly 50 percent and therefore each positive portion and each negative portion is equal to 1H in duration. When applied to the sampling gate 12 it permits the sampling gate to transmit the chrominance components exactly one half the time. The reason for delaying the time of switching so as to occur slightly before the next horizontal synchronizing signal, is to avoid having the switching take place in a visible part of the horizontal line. By virtue of the relatively long time *t* of the signal in FIG. 3B, the pulses P shown in FIG. 3D occur just before the leading edge of the next horizontal synchronizing signal $S_H$ in FIG. 3A.

Figure 4:
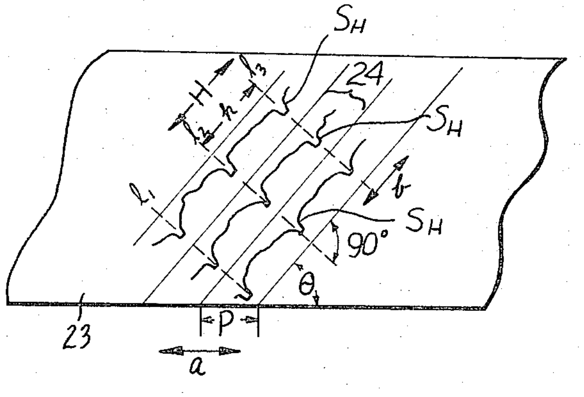
FIG. 4A shows a section of magnetic tape with a representation of several tracks if recorded video signals thereon.

FIG. 4 illustrates the relationship that obtains when there is what is known as H alignment of the signals on the magnetic tape. FIG. 4 shows a short strip of magnetic tape 23 with several recorded tracks 24 on it. For illustrative purposes, only a small portion of each of the tracks 24 is illustrated, and waveforms are shown in each track to indicate the location of the horizontal synchronizing signals. The direction of movement of the tape 23 is indicated by the arrow *a* and may be either to the left or to the right. Similarly, the rotating magnetic transducers 22*a* and 22*b* in FIG. 1 may scan the tracks 24 in either direction *b* that makes an angle of $\theta$ with respect to the longitudinal direction of the tape 23. The relative movement of the tape and the transducers is conventionally such that each of the tracks 24 contains a recording of all of the lines in one television field. In the case of the NTSC television system, each field has 262 and and ½ lines. Each frame is made of two fields and therefore has a total of 525 lines. Since the velocities are constant, each television line interval is recorded in an equal length of each of the tracks 24 and if it is assumed that the first track on the right in FIG. 4 is the first field of one television frame. the line recorded between the marks $1_1$ and $1_2$ represents the first line of this field. At the end of 262 a and ½ such lines, the second track 24 is begun.

Since the second track begins with a half line interval, the point designated by $1_1$ in the second track must be one-half line from the edge of the tape 23 at which the second track begins if there is to be H alignment. Thus, in the small triangle of which the pitch P is the hypotenuse and the alignment of the points $1_1$ is exactly perpendicular to the tracks 24, the distance between the intersection of the point 1 and the lower edge of the tape in the second track is $h/2$ where $h$ is the length of the track 24 needed to record one horizontal line interval H. Thus, $$h/2 = P \cos \theta$$

for H alignment. If the relationship between the tracks and the tape is somewhat different, H alignment can be obtained using the more general equation $$(X - ½)h = P \cos \theta$$

where X is any positive integer. The term P is given by the equation $$P = S \div 60$$

where S is the velocity of the tape in millimeters/ second, and the term $h$ is given by the equation $$h = 2V/(525 \times 60)$$

where V is the velocity of the transducers 22*a* and 22*b* along the tracks 24 in millimeters/ second.

Figure 5:
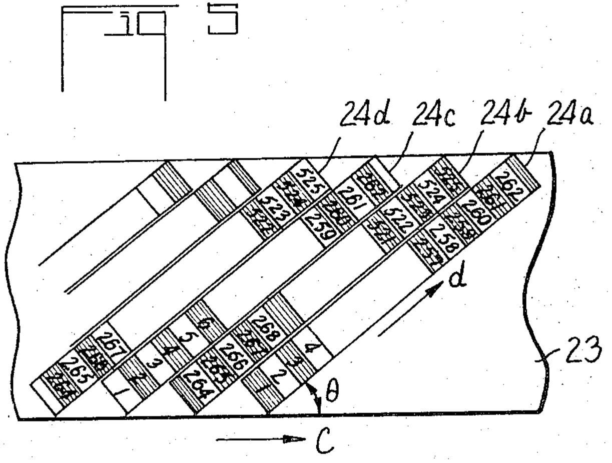
FIG. 5 shows a magnetic tape with several slant tracks of video signals recorded thereon by the system in FIG. 1.

FIG. 5 illustrates the relationship for H alignment when $X = 3$. The track 24*a* is illustrated partially divided into intervals of 1H and the shading indicates that the odd line intervals are the ones on which the chrominance signal has been recorded. Comparison of the tracks 24*a* and 24*b* shows that track 24*b* has been offset 2½$h$ from the track 24*a*, which means that $X = 3$. As a result, the 266th-line interval is located directly alongside the first line interval. Since the chrominance signal was recorded during the first line interval and all odd line intervals in the first track 24*a*, no shrominance signal must be recorded in the 266th-line interval or any even line interval in the second track 24*b*. As a result, such information is recorded only during odd line intervals in each of the tracks 24*a* and 24*b* which together comprise the first television frame on the tape 23. However, it will be observed that the same alignment requirement makes it necessary to record chromianace signals only during the even lines in the third track 24*c* and in the fourth track 24*d* which, together, make up the recording of the first and second fields of the second television frame. Thereafter for the next track, the relationship goes back to that of the first recorded track 24*a*. As may be seen, it requires two complete television frames made up of four fields to complete a switching cycle. In the example given, the chrominance signals were recorded in the four tracks 24*a*–24*d* in the order odd, odd, even, even. Alternatively, the information could have been recorded in the four tracks in the order even, even, odd, odd.

The direction of movement of the tape 23 in FIG. 5 is indicated by the arrow C and the direction of movement of the transducers in forming the tracks 24a–24d is indicated by the arrow d. Thus, the angle $\theta$ between the directions of these two arrows is less thean 90°. Furthermore, although the actual relationship of the tracks 24a–24d in FIG. 5 is such that $X=3$, the same relationship holds if X is any odd integer.

The patterns in FIGS. 5 can be generated by a simple switching circuit that simply transmits the gated signal to the transducers 22a and 22b during alternate line intervals of one field after another without any change.

Figure 6A:
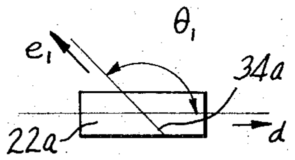
FIGS. 6A and 6B show the surfaces ofrecording and playback transducers with differently aligned air gaps.
Figure 6B:
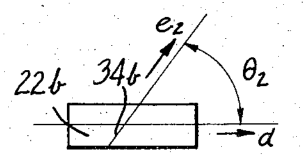
Figure 7:
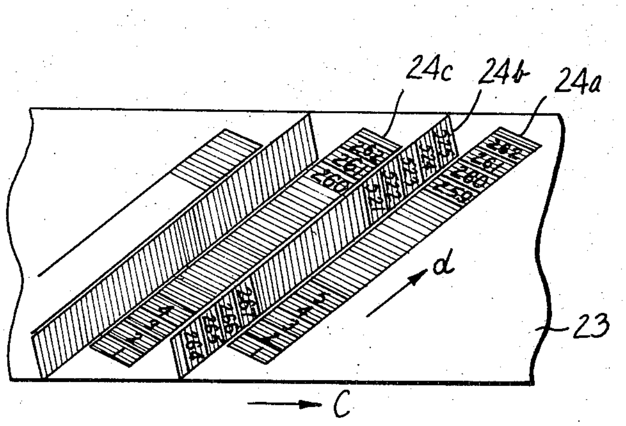
FIG. 7 shows a short length of magntic tape with several tracks of signals recorded by the transducers in FIGS. 6A and 6B.
Figure 8:
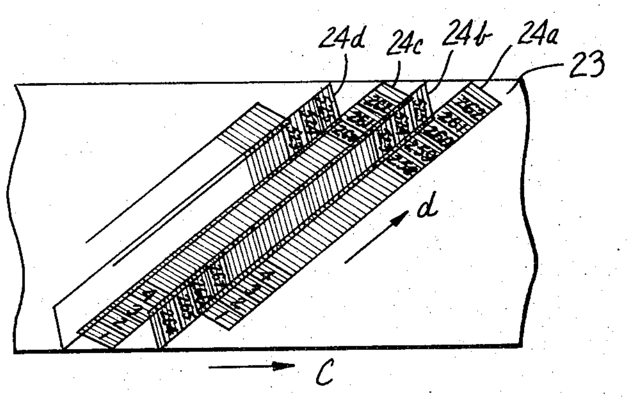
FIG. 8 shows a short length of magnetic tape with tracks of video signals similar to those in FIG. 7 but recorded thereon in overlapping relationship.

FIGS. 6A and 6B illustrate the tape-facing surfaces of two magnetic transducers 22a and 22b formed with air gaps having different azimuths. The angles between the direction of movement of the transducers 22a and 22b and the directions $e_1$ and $e_2$ of the gaps 34a and 34b in these transducers are identified as $\theta_1$ and $\theta_2$, which are not equal to each other. The tracks recorded using such transducers are shown in FIGS. 7 and 8. All line intervals are indicated shaded in these figures to illustrate the fact that the luminance signal is recorded in every interval. However, as is more clearly evident in the earlier FIG. 5, the chrominance signal is recorded only on alternate lines. As was true in the case of the recordings indicated in FIG. 5, the tracks 24 may be placed very close to each other because the potentially interfering signals are not recorded in adjacent areas. In fact, as shown in FIG. 8, it is possible for the tracks to be recorded in such a way that they overlap each other slightly, for example, to the extent of approximately 10 percent of their total width, or even somewhat more, without the danger of crosstalk. In the case of transducers having different azimuths, the crosstalk is inherently reduced because the signals picked up from an adjacent second track recorded at a second azimuth by a transducer having an azimuth corresponding to the first track would be indistinct, especially for high frequency components. Reducing the guard band spacing between adjacent tracks to a small fraction of the track width is a distinct advantage over existing recording apparatus, but reducing the guard band to zero or even less than zero is, of course, an even greater improvement.

Figure 9:
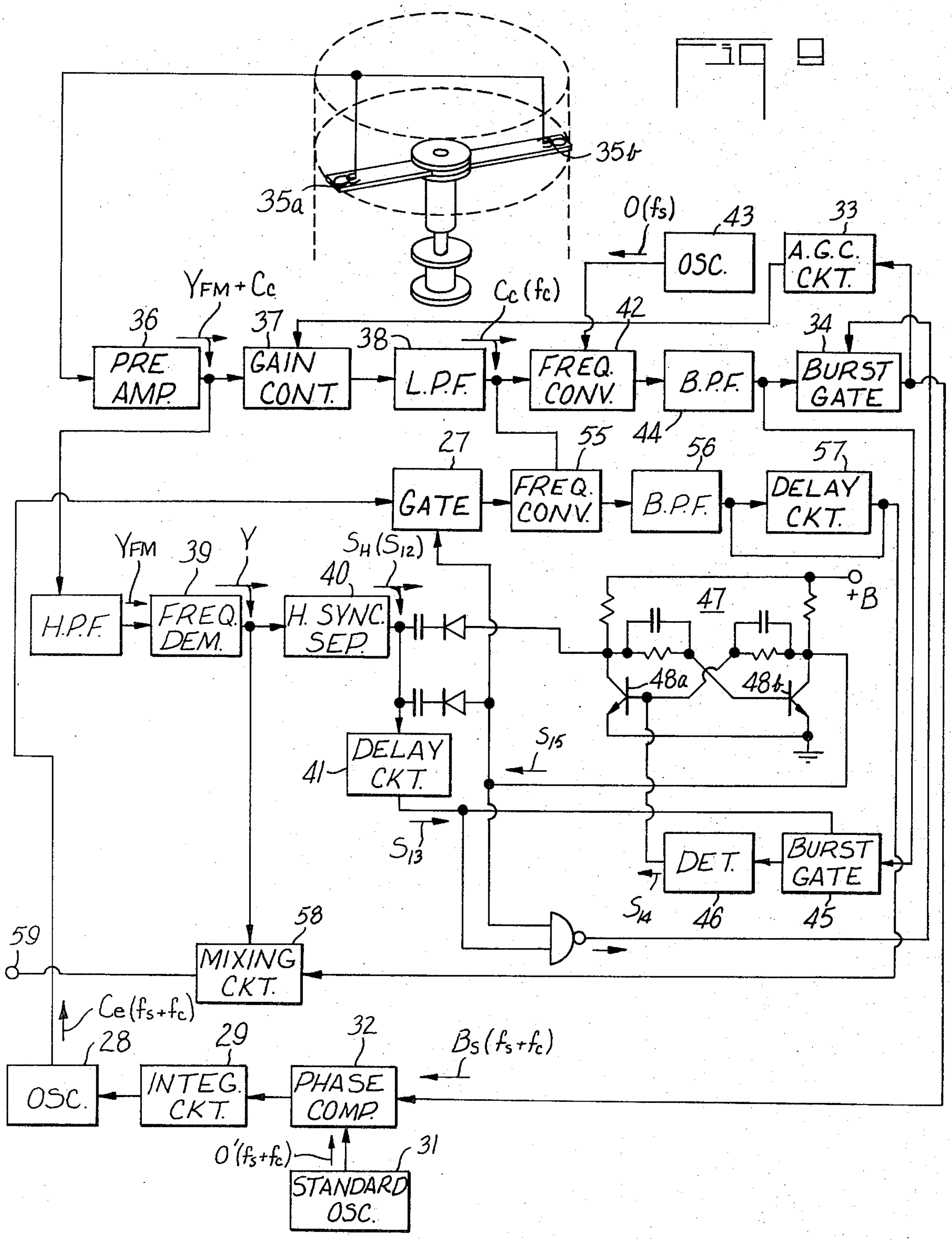
FIG. 9 is a block diagram of the video signal reproducing system to reproduce signals recorded by the system in FIG. 1.

FIG. 9 shows apparatus for reproducing signals as recorded in the patterns illustrated in FIG. 5, or in FIGS. 7 or 8. FIG. 9 has playback transducers 35a and 35b and if these transducers have azimuth angles of 90°, they are suitable for reproducing the signals as recorded in FIGS. 5, but if they have azimuth angles corresponding to those illustrated in FIGS. 7 and 8, this system is suited for reproduction of signals recorded as shown in FIGS. 7 and 8.

In the FIG. 9, it will be seen that the combined signal $Y_{FM} + C_c$ which has been recorded on the tape 11 may be reproduced by the transducers 35a and 35b in contact with the tape. The transducers 35a and 35b are connected in parallel to a preamplifier 36, the output of which is connected to a variable gain circuit 37. The signal from this variable gain circuit is applied to a low pass filter 38 that passes the band of frequencies in which the chrominance signal $C_c$ is recorded.

A frequency-converter 42 receives the signals from the low pass filter 38 as well as signals from an oscillator 43, having a frequency of $O(f_s)$. The output of the frequency-converter 42 is connected to a band pass filter 44 tuned to a band around the frequency of $B_s(f_s+f_c)$, and the output of this filter is connected to a burst gate 45 that receives gating signals from the delay circuit 41. The output of the burst gate 45, in turn, is connected to a detector 46, and this detector supplies its putput signals to a flip-flop circuit 47, specifically to the base of a transistor 48a. The transistor 48a and another transistor 48b are the active elements of the flip-flop.

A NAND gate 49 receives signals from the delay circuit 41 and from the flip-flop 47. The output of the NAND gate 49 is connected to a burst gate 34 which receives converted chrominance signals from the band pass filter 44. The output of the burst gate 34 is connected to an automatic gain control circuit 33 which is connected back to the variable gain circuit 37.

The output signal $B_s(f_s+f_c)$ is also supplied to a phase comparator 32 as a comparator signal. An oscillator 31 generating a fixed carrier signal $O'(f_s+f_c)$, is supplied to the comparator circuit 32 as a reference signal. The output signal of the comparator circuit is supplied to an intergrating circuit 29, so that the output of this circuit is a direct voltage, the magnitude of which depends on the change of the carrier frequency $f_c$ of the chrominance signal $C_c(f_c)$ or its phase shift (due to variation in the tape speed), and this direct voltage output is supplied to the oscillator 28 of the variable frequency or phase type as a control signal. The center frequency of this oscillator is $(f_s+f_c)$.

Signals from the oscillator 28 are fed to a gate circuit 27, the gating operation of which is controlled by gating signals from the flip-flop circuit 47. The output of the gate circuit 27 is connected to a second frequency-converter 55 which also receives signals $C_c(f_c)$ from the low pass filter 38. This circuit converts the frequency of the chrominance signals from a carrier frequency of $f_c$ to a carrier frequency of $f_s$, which is 3.58 MHz, and supplies an output signal to a band pass filter 56. The output of this circuit is connected to the input of a delay circuit 57 and to a mixing circuit 58. The output of the delay circuit 57 is also connected to the same mixing circuit 58 and the output of the mixing circuit is derived at a terminal 59.

Figures 10A, 10B, 10C, 10D, 10E, 10F, 10G, 10H, 10I, 10J, 10K:
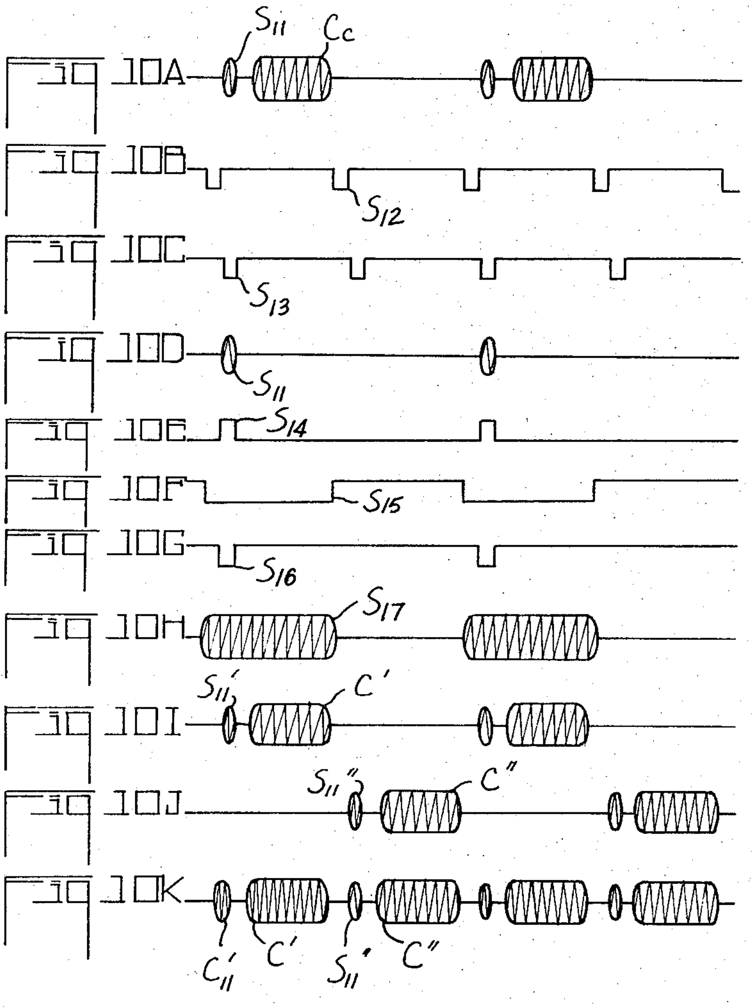
FIGS. 10A–10K illustrate signal waveforms typical of operation of the system in FIG. 9.

The operation of the circuit in FIG. 9 will be described with reference to the waveforms in FIGS. 10A–10K. The transducers 35a and 35b pick up from the magnetic tape a signal that includes both the frequency-modulated luminance components $Y_{FM}$ and the gated chrominance components $C_c$. The latter also include the burst signals and are indicated in FIG. 10A as occurring in alternate line intervals of time. After the luminance signal has been amplified by the preamplifier 36 and demodulated in the demodulator 39, the sync separator 40 separates the horizontal synchronizing signals indicated by the wave $S_H$ in FIG. 3A and the wave $S_{12}$ in FIG. 10B. These signals are delayed slightly in the circuit 41, sufficiently to act as burst gate signals $S_{13}$ shown in FIG. 10C.

The chrominance signals and burst signals are passed through the variable gain circuit 37 and the low pass filter 38 to the frequency-converter 42. This circuit shifts the carrier frequency of the chrominance signals and burst signals to a frequency of $(f_s+f_c)$ and this converted frequency band passes through the band pass filter 44 to the burst gate 34. The gating signals from the delay circuit 41 allow only the burst signals $S_{11}$ shown in FIG. 10D to pass through the gate 45 and be applied to the detector 46. The detected burst signals are indicated by the pulse waveform $S_{14}$ in FIG. 10E, and this pulse signal is applied to the base of the transistor 48a in the flip-flop circuit 47 as an identification signal.

The flip-flop circuit 47 has its condition of conductivity reversed at the occurrence of each of the horizontal synchronizing signals $S_{12}$ transmitted from the horizontal sync separator circuit 40 to both of the transistors 48a and 48b. As a result, the flip-flop 47 generates an output signal $S_{15}$ as shown in FIG. 10F. The purpose of the detected burst signal $S_{14}$ is to reverse the conductivity of the flip-flop 47 if the conductivity is not correct.

The detected burst signal $S_{14}$ is a positive pulse and of the base of the transistor 48a is already positive, the positive pulse $S_{14}$ will have no further effect. However, if the base of the transistor 48a is at its low level, the detected burst signal $S_{14}$ will cause a reversal of conductivity of the flip-flop circuit to bring it into the correct time relationship. Thereafter, further burst signals will have no effect.

When the delayed horizontal synchronizing pulses from the delay circuit 41 and the correct output signal from the flip-flop circuit 47 are applied to the NAND gate 49, the output signal $S_{16}$ shown in FIG. 10G will be produced to be applied as a gating signal to the burst gate 34. This circuit receives the same chrominance and burst signals as the burst gate 45 and produces a gated output signal that controls the AGC circuit 37, to adjust its gain as necessary to provide the correct amplitude of chrominance signals.

The output signal of the burst gate 34 is also applied to the phase comparator 32 to produce a phase controlled signal $C_c$ having a frequency $(f_s+f_c)$. This signal $C_c(f_s+f_c)$ is gated in a gate circuit 27 by the output signal of the flip-flop 47 so that it is applied during alternate line intervals to the second frequency-converter 55.

This frequency-converter 55 receives the chrominance signals from the low pass filter 38 and converts them to a band around the correct carrier frequency of 3.58 MHz. These signals are applied to the frequency-converter 55 only during the same alternate line intervals that the gated oscillations from the oscillator 28 are supplied. The latter are indicated by the signal $S_{17}$ in FIG. 10H. The band pass filter 56 allows only the properly converted chrominance signals C' and $S_{11}'$ shown in FIG. 10I to pass through to the delay circuit 57. These signals are delayed 1H in the circuit 57 and appear as an output comprising the chrominance signals C'' and $S_{11}''$ shown in FIG. 10J. Both the non-delayed and delayed signals are mixed in the mixing circuit to produce, at the output terminal 59, a complete signal of the type shown in FIG. 10K and comprising the chrominance signals C' and the burst signals $S_{11}'$ as well as the chrominance signals C'' and the burst signals $S_{11}''$. The mixing circuit 58 also mixes these signals with the demodulated luminance signal from the demodulator 39 to form a reconstituted video signal. As is well known, there is relatively little change in the chrominance signals C'' in place of the non-recorded chrominance signals has no adverse effect on the quality of the picture.

From the foregoing, the recording reproducing sections, of the system according to an embodiment of the present invention will be apparent. However, further description will be made of the relationship between the carrier frequency $f_c$ of the frequency-converted chrominance signal and the horizontal synchronization frequency of the luminance signal.

The carrier frequency is selected so as to satisfy the specific condition in which there is an interleaving relation between certain of its harmonics (i.e., those harmonics which cause interference) and the luminance signal. The second harmonic, particularly, has previously been discovered to be the cause of interference beats. This will be realized in the following discussion and with reference to FIG. 11. For ease of understanding, suppose that the frequency-modulated luminance signal is modulated by a signal having only one frequency $f_y$ and the frequency-converted chrominance signal has only the single frequency $f_c$ which is its carrier frequency. The luminance signal magnetically recorded on a magnetic tape includes beat signals occurring between the luminance signal frequency $f_y$ and the chrominance signal frequency $f_c$. The intensity frequency distribution of the signals are shown as FIG. 11 and it is generally described as $f_y \pm nf_c$ where $n$ is 0 or a positive integral number.

When the recorded signal having the foregoing spectrum is reproduced and frequency demodulated, the demodulated luminance signal includes the signals whose frequencies are shown as $nf_c$. More specifically, not only is the true luminance signal Y reproduced, but the carrier $f_c$ and its harmonics signals $nf_c$ of the frequency-converted chrominance signal $C_c$ are also reproduced and appear in the luminance signal. These chrominance signals in the reproduced luminance signal cause the beat interference in the reproduced picture.

Figure 11:
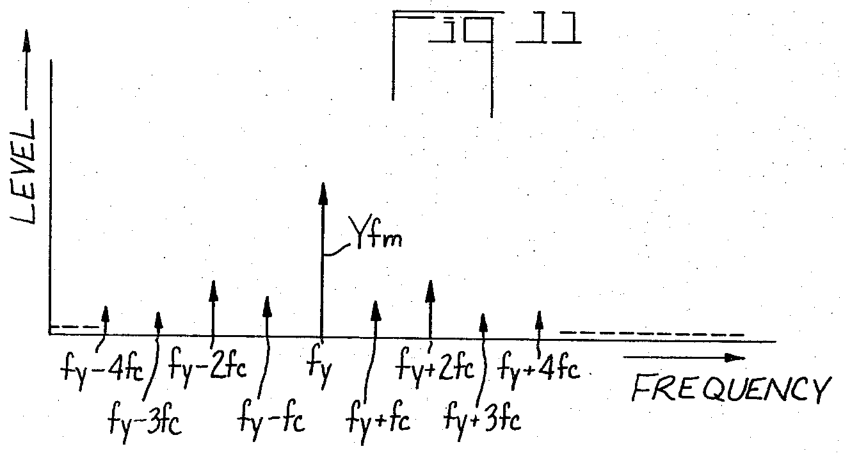
FIG. 11 represents a frequency spectrum of the frequency-modulated carrier and harmonics of the frequency-converted chrominance carrier.

It has been discovered that the signal corresponding to the second harmonic $2f_c$ of the carrier $f_c$ of the frequency-converted chrominance signal, which is included in the reproduced luminance signal, has a relatively large level compared with the signals corresponding to the first and other harmonics of the carrier frequency, as is shown in FIG. 11. This second harmonic causes most of the deterioration in the reproduced picture. All other signals are able to be substantially neglected. This fact is understood to occur because of ordinary magnetic characteristics of the recording systems. If the major source of beat interference can be removed, the amplitude of the whole frequency-converted chrominance signal may be increased, with the result that a strong chrominance signal may be reproduced with good signal-to-noise ratio.

In the recording system described in U.S. Pat. No. 3,730,983 the chrominance signal components would be recorded during every line interval. By selecting the frequency $f_c$ of the frequency-converted carrier to have a frequency given by the equation $$f_c = \frac{1}{4}(2m-1)f_H,$$

where $m$ is an integer and $f_H$ is the fundamental of the horizontal scanning frequency, this interleaving could be accomplished. The bright spots produced in the final color television image would be located in a regular matrix in which the spots would be relatively equally spaced apart both horizontally and vertically and so would not be objectionable. They would appear somewhat like a pale grey background over the whole image.

However, in the improved system in which only alternate line intervals are recorded, the dots in the final image would be arranged more noticeably in vertical columns spaced apart by the wavelength of the frequency $f_c$ as drawn by the scanning electron beams in the cathode ray tube. Such columns can be very objectionable.

Accordingly, the frequency $f_c$ generated in the frequency-converter must be set to a value that will redistribute the bright spots into a rectangular array instead of in columns.

Figure 12:
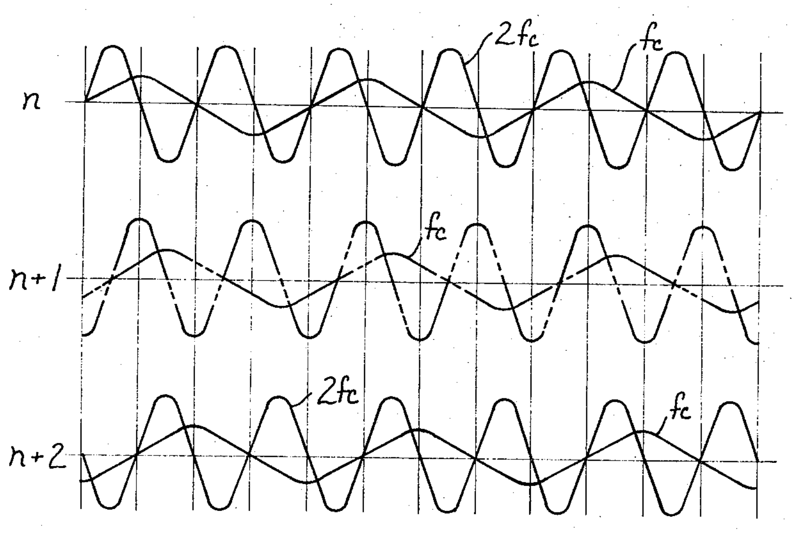
FIG. 12 represents the relationship between the scanning line on the television cathode ray tube and the frequency-converted carrier and its second harmonic for successive line intervals of a television image.

FIG. 12 shows just the signal $f_c$ and its second harmonic $2f_c$ as they would be reproduced by a cathode ray oscilloscope in which the horizontal scanning rate was the same as the horizontal scanning rate of the television system. FIG. 12 illustrates these waveforms for three successive lines, $n$, $n+1$, and $n+2$ of one field. The reason that the line $n+1$ is shown in broken form is that it would not actually be recorded. For example, it might be the signals $f_c$ and $2f_c$ corresponding to any of the even-numbered lines in track 24a in FIG. 5.

Figure 13:
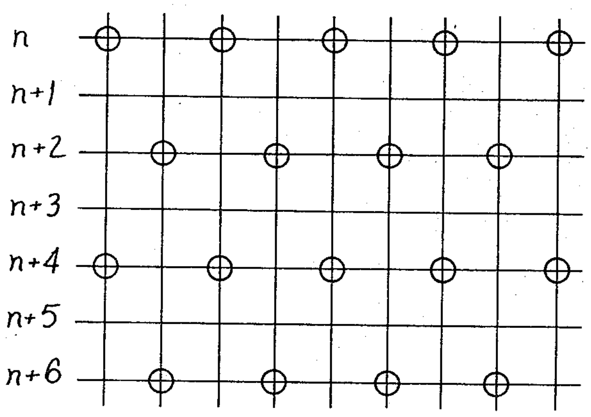
FIG. 13 represents the display of bright spots in a color television image due to the second harmonic of the frequency-converted chrominance signal during those line intervals which the chrominance components are utilized without delay.

The bright spots that would appear on the cathode ray picture tube producing the color image would correspond to the positive peaks of the second harmonic $2f_c$. These spots are illustrated in FIG. 13 as they would be displayed in one small section of the image. As may be seen by comparing FIGS. 12 and 13, the spots in line $n+2$ are offset with respect to those in line $n$ and $n+4$ and so do not tend to form a vertical line.

As described in connection with FIG. 9, the chrominance signals for the alternate lines $n+1$, $n+3$, etc. would be identical with the chrominance signals of the immediately preceeding lines $n$, $n+2$, etc. Thus, the spots in lines $n+1$, $n+3$, etc. would appear directly under the spots in lines $n$, $n+1$, n+3, etc.

In order to shift the spots from vertical columns to the offset positions in FIG. 13, the frequency of the second harmonic $2f_c$ must be interleaved with the scanning frequency. As shown in FIG. 12, the sine wave representing $2f_c$ is shifted a quarter wave each line. This is the requirement for offsetting the spots, and it is met by selecting the frequency $f_c$ from the frequency-converter 9 such that $$f_c = \tfrac{1}{8}(2m-1)f_H,$$

where, as before, $m$ is an integer and $f_H$ is the horizontal scanning frequency. To express it another way, the frequency $f_c$ must be selected so that there is an odd number of quarter cycles of the second harmonic $2f_c$ in each line interval.

As the scanning continues into the second, or interlaced field, another set of bright spots would appear on horizontal lines midway between the horizontal lines in FIG. 12 but with the same type of horizontal offsetting on alternate lines.

Successive fields will result in bright spots at other intersections, so that the pattern of spots is much more spread out than is the case with the frequency of $f$ as determined in U.S. Pat. No. 3,730,983. However, since there is approximately the same number of such spots per frame, the dispersed spots of the present invention do not contribute more total brightness than in the prior patent. It takes several fields to generate the total number of such spots, and thus they are integrated physiologically by the viewer into a dim, grey light over the shole screen instead of relatively widely spaced and distinct vertical lines as in the prior patent.

Figure 14:
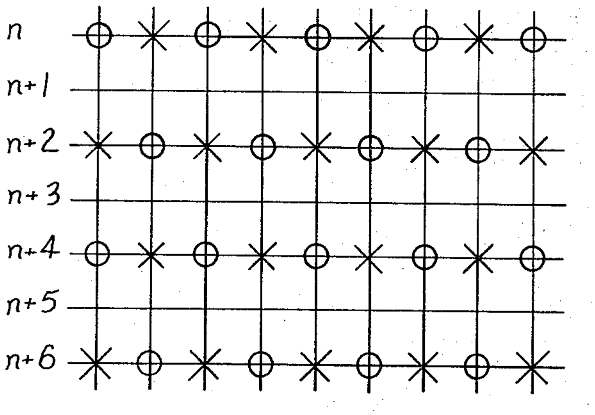
FIG. 14 shows an array of spots corresponding to the array in FIG. 13 as generated during alternate fields.

FIG. 14 shows another set of such spots at the points marked X midway between the first such set of spots marked O and copied from FIG. 13. These spots are only two of the sets and even they do not show the sets that would result from reproducing the delayed chrominance signals. The latter would produce additional sets of spots directly under the two sets shown but on lines $n+1$, $n+3$, $n+5$, etc.

The spots can be dispersed still more by modifying the generation of the frequency $f_c$ by the following equation:

$$f_c = \tfrac{1}{8}(2m-1)f_H \pm f_V/4$$

where $f_V$ is the vertical scanning frequency.

What is claimed is:

1. A system for magnetically recording color television signals, said system comprising:

A. means to convert the frequency of chrominance components of the signals to a relatively low frequency band such that the chrominance carrier has a frequency $f_c$ determined substantially by the equation $$f_c = \tfrac{1}{8}(2m-1)f_H,$$

where $m$ is a suitable positive integer and $f$ is the horizontal scanning frequency of the signals, and B. means to record successive field intervals of the signals on adjacent parallel tracks on a magnetic tape in H alignment, said means recording the chrominance components during alternate line intervals only, of each of said tracks and in such relation to adjacent tracks that each line interval in which chrominance components are recorded in one of said tracks is side-by-side with a line interval in which shrominance components are not recorded in the next adjacent one of said tracks.

2. The system of claim 1 in which said means to convert the frequency of chrominance components comprises means to shift said carrier frequency to a frequency $f_c$ determined by the equation $$f_c = \tfrac{1}{8}(2m-1)f_H \pm f_V/4$$

where $f_V$ is the field repetition frequency of the television signals.

3. The system of claim 1 in which said means to record comprises:

A. recording head means; and

B. gating means, said recording head means being connected to said gating means to record the chrominance components only during alternate line intervals.

4. The system of claim 1 comprising, in addition:

A. means to pick up the signals recorded on said tape;

B. means to delay each line interval of chrominance components for an odd integral multiple of a line interval to form a delayed replica; and, C. means to utilize said chrominance components and said delayed replicas in the reproduction of a color television image.

5. A color television image reproducing system comprising:

A. magnetic signal pickup means to pick-up signals recorded in parallel tracks on magnetic tape and in H alignment, chrominance components of the signals being recorded only in alternate line intervals;

B. means to delay each line interval of chrominance components by an odd integral multiple of a line interval to form a delayed replica thereof; and C. means to utilize said chrominance components and said delayed replicas in the reproduction of a color television image, said last-named means comprising:

1. means to reconvert the frequency of said chrominance components and delayed replicas to a frequency band including a standard color television subcarrier frequency $f_s$, and, 2. means to generate a signal having a frequency $f_s+f_c$ where the frequency $f_c$ is substantially determined by the equation $$f_c = \frac{1}{8}(2m-1)f_H,$$

where $m$ is a positive integer and $f_H$ is the horizontal scanning frequency of the television signals.

* * * * *